(12) United States Patent
Zhang et al.

(10) Patent No.: US 11,341,884 B2
(45) Date of Patent: May 24, 2022

(54) DATA DRIVING CIRCUIT FOR REDUCING POWER CONSUMPTION, DRIVING CHIP AND DISPLAY DEVICE

(71) Applicant: SeeYA Optronics Co., Ltd., Shanghai (CN)

(72) Inventors: Haodong Zhang, Shanghai (CN); Ping-Lin Liu, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 0 days.

(21) Appl. No.: 17/003,668

(22) Filed: Aug. 26, 2020

(65) Prior Publication Data

US 2021/0201735 A1 Jul. 1, 2021

(30) Foreign Application Priority Data

Dec. 31, 2019 (CN) .......................... 201911418039.4

(51) Int. Cl.
*G09G 3/20* (2006.01)

(52) U.S. Cl.
CPC ....... *G09G 3/20* (2013.01); *G09G 2300/0426* (2013.01); *G09G 2310/0272* (2013.01); *G09G 2310/0291* (2013.01)

(58) Field of Classification Search
None
See application file for complete search history.

(56) References Cited

U.S. PATENT DOCUMENTS

| 2011/0130981 A1* | 6/2011 | Chaji | G09G 3/3233 |
| | | | 702/58 |
| 2017/0186388 A1* | 6/2017 | Zheng | G09G 3/3648 |
| 2019/0088183 A1* | 3/2019 | Jeong | G09G 3/20 |

* cited by examiner

*Primary Examiner* — Amr A Awad
*Assistant Examiner* — Donna V Bocar
(74) *Attorney, Agent, or Firm* — Knobbe, Martens, Olson & Bear, LLP

(57) ABSTRACT

Provided is a data driving circuit, including: a pixel current generation circuit including an input terminal and an output terminal and configured to generate a pixel current based on a data voltage inputted via the input terminal, wherein the output terminal of the pixel current generation circuit is configured to be connected to a pixel circuit; and a first operational amplifier including a first input terminal connected to the output terminal of the pixel current generation circuit, a second input terminal, and an output terminal. A first voltage is inputted via the second input terminal of the first operational amplifier and is positively related to the data voltage, and the output terminal of the first operational amplifier is configured to be connected to the pixel circuit; and wherein the first operational amplifier is configured to generate a bias current based on the first voltage.

8 Claims, 8 Drawing Sheets

US 11,341,884 B2

DATA DRIVING CIRCUIT FOR REDUCING POWER CONSUMPTION, DRIVING CHIP AND DISPLAY DEVICE

CROSS-REFERENCE TO RELATED APPLICATIONS

The present application claims priority to Chinese Patent Application No. 201911418039.4, filed on Dec. 31, 2019, the contents of which are incorporated herein by reference in its entirety.

TECHNICAL FIELD

The present disclosure relates to the field of display technologies, and in particular, to a data driving circuit, a driving chip, and a display device.

BACKGROUND

With development of display technologies, demands for power consumption of a driving chip of a display device have increased.

A display panel in the related art usually includes a plurality of pixel circuits, and a driving method for the pixel circuits is generally classified as a current-driving type and a voltage-driving type.

For a display panel of a current-driving type, there is a problem that power consumption of the driving chip is relatively large.

SUMMARY

An embodiment of the present disclosure provides a data driving circuit, including: a pixel current generation circuit including an input terminal and an output terminal and configured to generate a pixel current based on a data voltage inputted via the input terminal, wherein the output terminal of the pixel current generation circuit is configured to be connected to a pixel circuit; and a first operational amplifier including a first input terminal, a second input terminal, and an output terminal, wherein the first input terminal of the first operational amplifier is connected to the output terminal of the pixel current generation circuit, a first voltage is inputted via the second input terminal of the first operational amplifier and is positively related to the data voltage, and the output terminal of the first operational amplifier is configured to be connected to the pixel circuit; and wherein the first operational amplifier is configured to generate a bias current based on the first voltage.

An embodiment of the present disclosure provides a driving chip, including a plurality of data driving circuits according to the first aspect. The driving chip further includes a plurality of first terminals, wherein each of the plurality of first terminals is connected to the output terminal of the pixel current generation circuit of one of the plurality of data driving circuits; a plurality of second terminals, wherein each of the plurality of second terminals is connected to the output terminal of the first operational amplifier of one of the plurality of data driving circuits.

An embodiment of the present disclosure provides a display device including the driving chip according to the second aspect and a display panel. The display panel includes a plurality of pixel circuits, a plurality of pixel current transmission lines each one corresponding one of to the plurality of data driving circuits, driving voltage transmission lines and a plurality of scan lines. Each of the plurality of pixel circuits includes a driving voltage writing circuit, a driving circuit, and a feedback circuit. Each of the plurality of first terminals of the driving chip is connected to the feedback circuits of one column of pixel circuits of the plurality of pixel circuits via a corresponding one of the plurality of pixel current transmission lines. The feedback circuit is configured to feed back the pixel current to a corresponding one of the plurality of first terminals based on a scan signal transmitted on one of the plurality of scan lines. Each of the plurality of second terminals of the driving chip is connected to the driving voltage writing circuits of one column of pixel circuits of the plurality of pixel circuits via a corresponding one of the driving voltage transmission lines. The driving voltage writing circuit is configured to write a driving voltage to a control terminal of the driving circuit based on a scan signal transmitted on one of the plurality of scan lines.

With the data driving circuit provided by this embodiment, each pixel current generated by the pixel current generation circuit corresponds to a respective bias current of the first operational amplifier adapted thereto. Compared with an operational amplifier with a large fixed bias current in the related art, the embodiments of the present disclosure can facilitate reducing the power consumption of the data driving circuit while ensuring the stability of the operational amplifier and the two-pole system.

DESCRIPTION OF EMBODIMENTS

Figure 1:
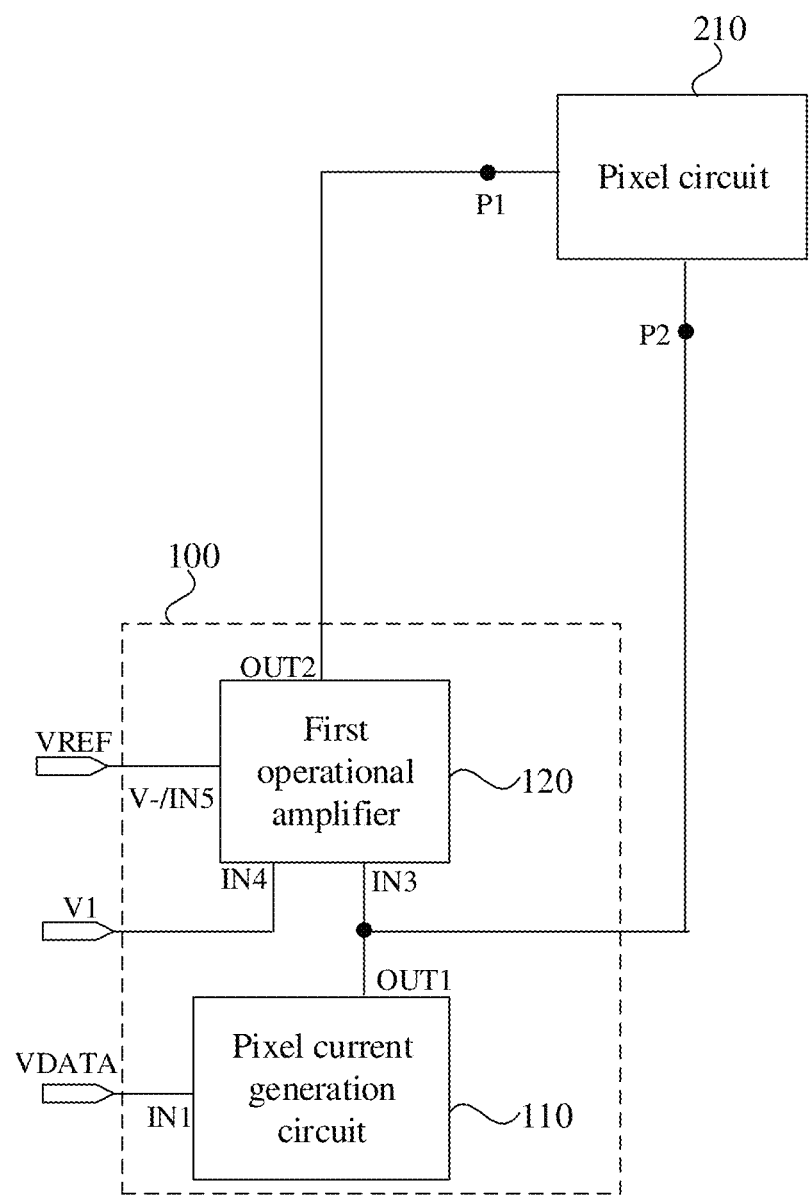
FIG. 1 is a schematic diagram of a structure of a data driving circuit according to an embodiment of the present disclosure.

The present disclosure will be further described in details in the following with reference to the accompanying drawings and embodiments. It should be understood that the embodiments described herein are intended to illustrate the present disclosure rather than to limit the present disclosure. In addition, it should be noted that, for ease of description, the accompanying drawings merely shows parts but not all structures related to the present disclosure.

As described in the background, for the display panel of a current-driving type in the related art, there is a problem that the power consumption of the driving chip is relatively large. The reason for the above problem will be explained as follows. The existing driving chip usually includes a data driving circuit generally including an operational amplifier, an output terminal of the operational amplifier can output a driving voltage to a corresponding pixel circuit, and the operational amplifier and the corresponding pixel circuit driven by the operational amplifier can form a two-pole system. In the related art, a display panel of a current-driving type usually includes a pixel circuit of a current-driving type, which generates a corresponding pixel current based on grayscale data. A bias current of the operational amplifier is usually a fixed current, and the bias current needs to be adapted to the pixel current corresponding to respective grayscale data. The output terminal of the operational amplifier is connected to the pixel circuit through a driving signal line, and the output of the operational amplifier forms a pole, such as a first pole. When the pixel current flows through a driving transistor in the pixel circuit, another pole, such as a second pole, will be formed. A relative positional relation between the first pole and the second pole determines stability of the operational amplifier. Specifically, the farther a position of the first pole is from the second pole in a Bode diagram, the more stable the operation of the operational amplifier and the two-pole system is. To ensure stable operation of the circuit of the two-pole system, the two poles need to have primary and secondary. The smaller the primary pole is, the larger the secondary pole is, and the more stable the circuit of the two-pole system is. An example, in which the second pole is the primary pole and the first pole is the secondary pole, will be described as follows. In such example, in a frequency domain, a distance from the second pole to an origin shall be smaller, and a distance from the first pole to the origin shall be larger. In this way, the distance from the first pole to the second pole can be greater than or equal to a first distance threshold (the first distance threshold can be a critical distance that ensures the stability of the circuit of the two-pole system), thereby ensuring stable operation of the operational amplifier. Here, the position of the first pole is related to the bias current, and the position of the second pole is related to the pixel current. Since the bias current is a fixed current, the position of the first pole is fixed. Generally, the larger pixel current leads to that the position of the second pole is farther. The larger bias current leads to that the position of the first pole is farther. Therefore, the fixed bias current needs to satisfy that the distance from the first pole to the second pole is greater than or equal to the first distance threshold for the maximum pixel current corresponding to the grayscale data, so that the operational amplifier can operate stably. Thus, the fixed bias current of the operational amplifier is large, leading to the more power consumption of the entire driving chip. Moreover, the small pixel current may lead the redundant bias current.

In view of the above problem, embodiments of the present disclosure provide a data driving circuit. FIG. 1 is a schematic diagram of a structure of a data driving circuit according to an embodiment of the present disclosure. With reference to FIG. 1, the data driving circuit includes a pixel current generation circuit 110 and a first operational amplifier 120.

The pixel current generation circuit 110 includes an input terminal IN1 and an output terminal OUT1. The pixel current generation circuit 110 is configured to generate a pixel current based on a data voltage VDATA inputted via an input terminal IN1, and the output terminal of the pixel current generation circuit 110 is configured to be connected to a pixel circuit 210.

The first operational amplifier 120 includes a first input terminal IN3, a second input terminal IN4, and an output terminal OUT2. The first input terminal IN3 of the first operational amplifier 120 is connected to the output terminal OUT1 of the pixel current generation circuit 110. A first voltage V1 is inputted via the second input terminal IN4 of the first operational amplifier 120, which is positively related to the data voltage VDATA. The output terminal OUT2 of the first operational amplifier 120 is configured to be connected to the pixel circuit 210. The first operational amplifier 120 is configured to generate a bias current based on the first voltage V1.

As an example, the data driving circuit may be integrated into a driving chip, and the driving chip may further include a gamma circuit, which may be configured to generate the data voltage VDATA corresponding to a display grayscale. The input terminal of the pixel current generation circuit 110 may be electrically connected to the gamma circuit, that is, the input terminal of the pixel current generation circuit 110 is connected to the data voltage VDATA and the pixel current generation circuit 110 can generate a pixel current corresponding thereto based on the data voltage VDATA. After the pixel current is generated in the pixel current generation circuit 110, the pixel current can be outputted to the corresponding pixel circuit via the output terminal OUT1 of the pixel current generation circuit 110. The first operational amplifier 120 may further include a third input terminal IN5, which may serve as an inverting input terminal of the first operational amplifier 120. The inverting input terminal may be connected to a fixed reference voltage VREF. The first input terminal IN3 may serve as a non-inverting input terminal of the first operational amplifier 120, and a voltage of the non-inverting input terminal is a voltage of the output terminal of the pixel current generation circuit 110. The first operational amplifier 120 can generate, based on the pixel current, a driving voltage for driving the pixel circuit 210, and output the driving voltage. The pixel circuit 210 in the display panel is exemplarily shown in FIG. 1. The output terminal OUT2 of the first operational amplifier 120 may be electrically connected to a gate electrode of a driving transistor in the circuit 210, so that the driving transistor can generate, based on the driving voltage outputted from the first operational amplifier 120, a pixel current equal to the pixel current generated by the pixel current generation circuit 110. The output terminal of the pixel current generation circuit 110 may be electrically connected to a source electrode or a drain electrode of the driving transistor in the pixel circuit 210. Exemplarily, when the driving transistor is a P-type transistor, the pixel current generation circuit 110 may be electrically connected to the drain electrode of the driving transistor. In this case, a driving current flowing through the driving transistor can flow back to the pixel current generation circuit 110, so that the data driving circuit and the pixel circuit 210 driven thereby form a closed loop. As described in the background, the closed loop forms a two-pole system. The output of the output terminal OUT2 of the first operational amplifier 120 may form a pole, such as a first pole P1. When the pixel current flows through the driving transistor in the pixel circuit 210, another pole such as a second pole P2 will be formed. A relative positional relation between the first pole P1 and the second pole P2 determines stability of the operational amplifier.

With further reference to FIG. 1, the first voltage V1 is inputted via the second input terminal IN4 of the first operational amplifier 120, and the first operational amplifier 120 generates a bias current based on the first voltage V1. Since the first voltage V1 is positively related to the data voltage VDATA, the bias current of the first operational amplifier 120 is related to the data voltage VDATA. Each of different display grayscales corresponds to a different data voltage, that is, the corresponding bias current will change with a change of the data voltage VDATA. As described in the background, in a two-pole system, the farther the position of the first pole P1 is from the second pole P2, the more stable the operation of the entire two-pole system and the first operational amplifier 120 is. However, in order to ensure that the power consumption of the data driving circuit is not extremely large, the position of the first pole P1 cannot be infinitely far from the position of the second pole P2, that is, the distance from the first pole P1 to the second pole P2 shall satisfy that the stability of the entire two-pole system and the first operational amplifier 120 reaches a required target. In this embodiment, the pixel current generation circuit 110 generates a corresponding pixel current based on the data voltage VDATA inputted via the input terminal of the pixel current generation circuit 110. As an example, the pixel current is positively related to the data voltage VDATA, and the first operational amplifier 120 generates the bias current based on the first voltage V1 positively related to the data voltage VDATA. As another example, the bias current is positively related to the first voltage V1. Then, both the pixel current and the bias current are positively related to the data voltage VDATA, so that when the data voltage VDATA changes, both the pixel current and the bias current will change. Exemplarily, when the data voltage VDATA is increased, both the pixel current and the bias current will be increased, and thus both the position of the first pole P1 and the position of the second pole P2 become farther from the position of the origin in the frequency domain. When the data voltage VDATA is decreased, both the pixel current and the bias current will be decreased, and thus both the position of the first pole P1 and the position of the second pole P2 become closer to the position of the origin in the frequency domain. Thus, each pixel current corresponds to a respective bias current adapted thereto. Therefore, the bias current will not be redundant even if it corresponds to a smaller pixel current. Compared with an operational amplifier with a large fixed bias current in the related art, this embodiment of the present disclosure can reduce the power consumption of the data driving circuit while ensuring the stability of the operational amplifier and the two-pole system.

It should be noted that in the example described above, the pixel current is positively related to the data voltage, and the bias voltage is positively related to the first voltage. However, it is also possible that the pixel current is negatively related to the data voltage, and the bias voltage is negatively related to the first voltage, resulting in that both the pixel current and the bias current change in the same manner as the data voltage changes, thereby reducing the power consumption of the data driving circuit.

The data driving circuit provided by this embodiment includes the pixel current generation circuit and the first operational amplifier. The pixel current generation circuit includes the input terminal and the output terminal. The pixel current generation circuit is configured to generate the pixel current based on the data voltage inputted via the input terminal. The output terminal of the current generation circuit is configured to be connected to the pixel circuit. The first operational amplifier includes the first input terminal, the second input terminal, and the output terminal. The first input terminal of the first operational amplifier is connected to the output terminal of the pixel current generation circuit. The first voltage is inputted via the second input terminal of the first operational amplifier, and the first voltage is positively related to the data voltage. The output terminal of the first operational amplifier is configured to be connected to the pixel circuit. The first operational amplifier is configured to generate the bias current based on the first voltage. With the data driving circuit provided by this embodiment, each pixel current generated by the pixel current generation circuit corresponds to a bias current of the first operational amplifier adapted thereto. Compared with an operational amplifier with a large fixed bias current in the related art, the embodiments of the present disclosure can facilitate reducing the power consumption of the data driving circuit while ensuring the stability of the operational amplifier and the two-pole system.

Figure 2:
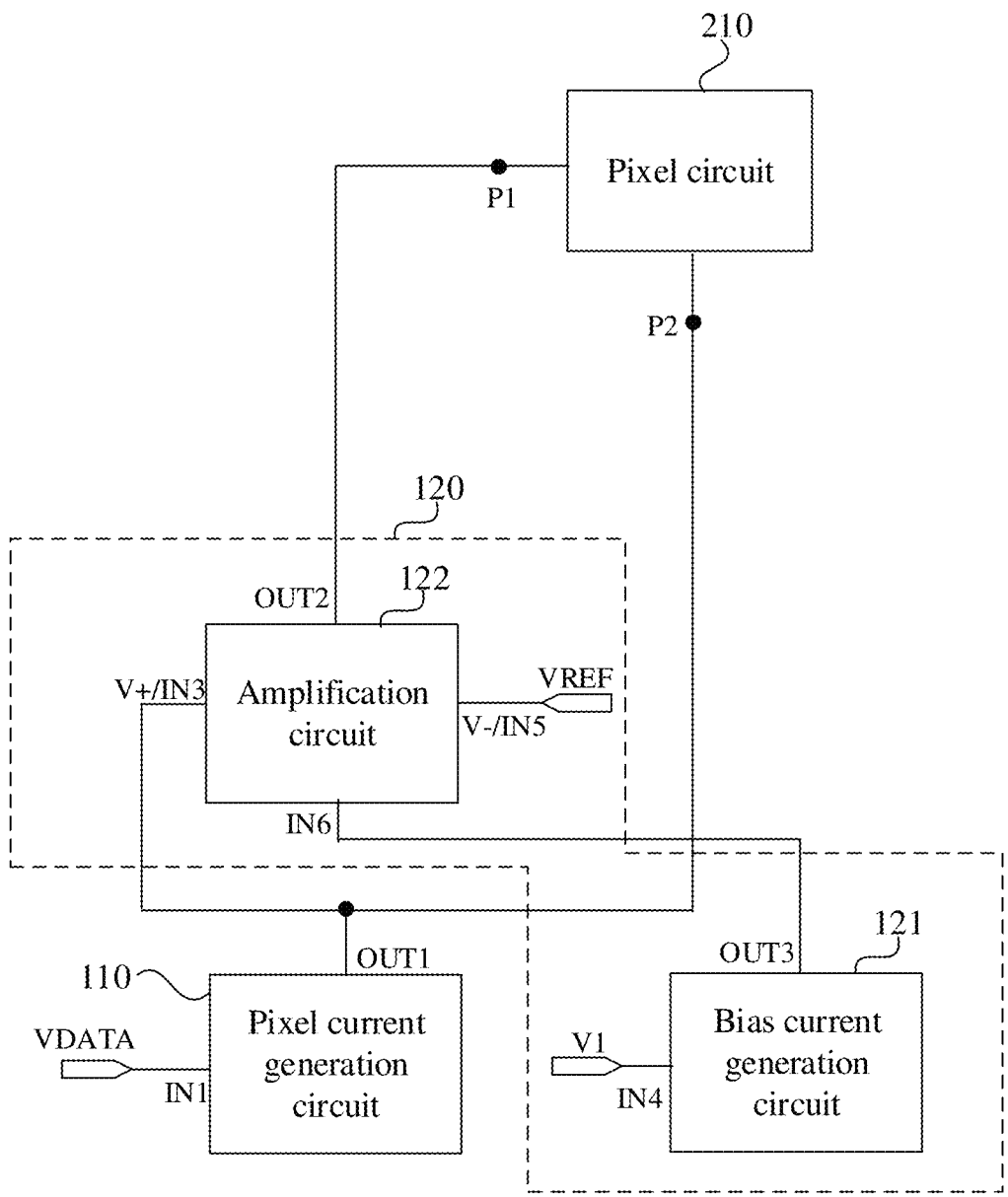
FIG. 2 is a schematic diagram of a structure of another data driving circuit according to an embodiment of the present disclosure.

FIG. 2 is a schematic diagram of a structure of another data driving circuit according to an embodiment of the present disclosure. With reference to FIG. 2, as an example, the first operational amplifier 120 includes a bias current generation circuit 121 and an amplification circuit 122. The bias current generation circuit 121 includes an input terminal and an output terminal. The input terminal of the bias current generation circuit 121 serves as the second input terminal IN4 of the first operational amplifier 120, and the bias current generation circuit 121 is configured to generate a bias current based on the first voltage V1 inputted via the input terminal of the bias current generation circuit 121.

The amplification circuit 122 includes a non-inverting input terminal V+, an inverting input terminal V−, a bias current input terminal IN6 and a driving voltage output terminal. The non-inverting input terminal V+ of the amplification circuit 122 serves as the first input terminal IN3 of the first operational amplifier, and a reference voltage VREF is inputted via the inverting input terminal V− of the amplification circuit 122. The bias current input terminal IN6 of the amplification circuit 122 is electrically connected to an output terminal OUT3 of the bias current generation circuit 121, and the driving voltage output terminal of the amplification circuit 122 serves as the output terminal OUT2 of the first operational amplifier 120.

With reference to FIG. 2, the bias current generation circuit 121 may generate a bias current based on the first voltage V1 inputted via the input terminal of the bias current generation circuit 121. Exemplarily, the bias current generation circuit 121 may include a transistor, and the first voltage V1 may be inputted to a gate electrode of the transistor. A source electrode of the transistor may be connected to a fixed voltage, so that the transistor can generate a bias current based on the first voltage V1 of the gate electrode. The bias current is inputted to the amplification circuit 122 via the bias current input terminal IN6 of the amplification circuit 122. The stability of the first operational amplifier 120 is related to the bias current generated by the bias current generation circuit 121.

With further reference to FIG. 2, the non-inverting input terminal V+ of the amplification circuit 122 is connected to the output terminal of the pixel current generation circuit 110, and the reference voltage is inputted via the inverting input terminal V−. The amplification circuit 122 can generate a driving voltage based on the pixel current and output it to the corresponding pixel circuit 210.

Figure 3:
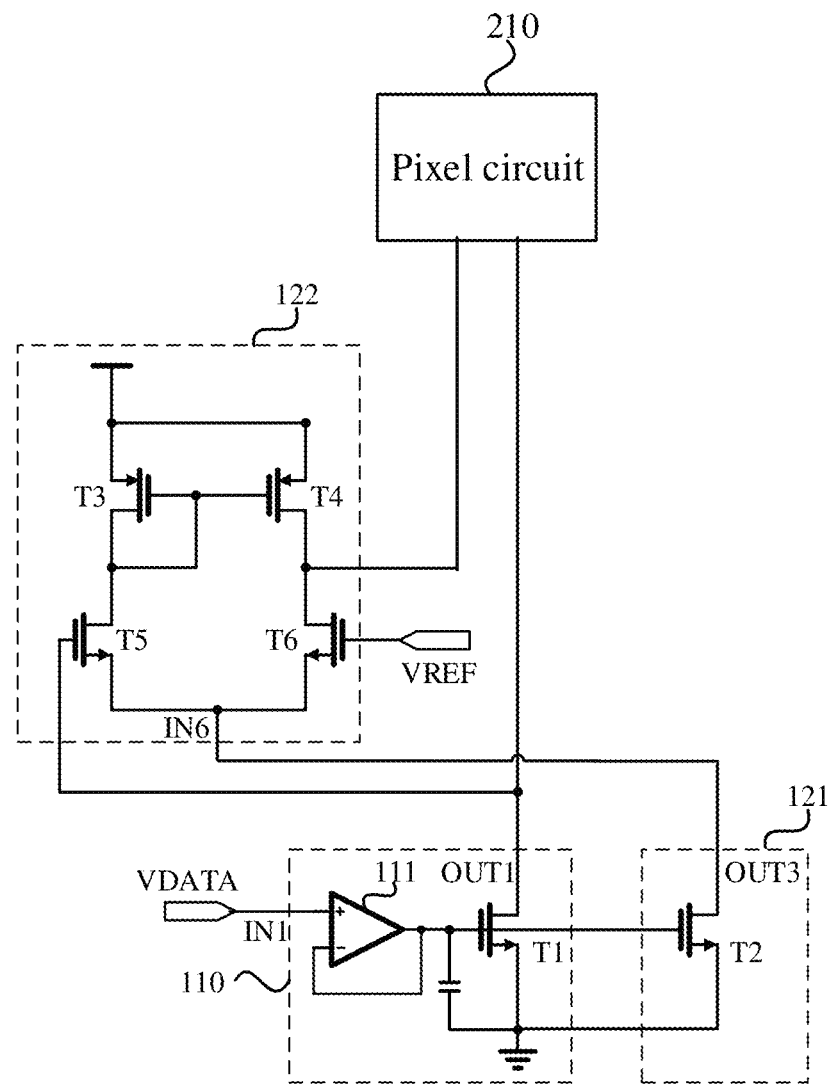
FIG. 3 is a schematic diagram of a structure of another data driving circuit according to an embodiment of the present disclosure.

FIG. 3 is a schematic diagram of a structure of another data driving circuit according to an embodiment of the present disclosure. With reference to FIG. 3, as an example, the pixel current generation circuit 110 includes a first transistor T1. The first transistor T1 has a gate electrode via which a first voltage V1 is inputted, a first electrode serving as the output terminal OUT1 of the pixel current generation circuit 110, and a second electrode connected to ground.

The bias current generation circuit 121 includes a second transistor T2. The second transistor T2 has a gate electrode electrically connected to the gate electrode of the first transistor T1, a first electrode that serves as the output terminal OUT3 of the bias current generation circuit 121 and is electrically connected to the bias current input terminal IN6 of the amplification circuit 122, and a second electrode connected to ground.

As an example, the first electrode of the first transistor T1 is a drain electrode, and the second electrode of the first transistor T1 is a source electrode. The first electrode of the second transistor T2 is a drain electrode, and the second electrode of the second transistor T2 is a source electrode. Both the second electrode of the first transistor T1 and the second electrode of the second transistor T2 are connected to ground, that is, a potential of the second electrode of the first transistor T1 is fixed. Therefore, the pixel current generated by the first transistor T1 is determined based on a voltage of the gate electrode of the first transistor T1 and a channel width-to-length ratio of the first transistor T1, and the bias current generated by the second transistor T2 is determined based on a voltage of the gate electrode of the second transistor T2 and a channel width-to-length ratio of the second transistor T2. Since the gate electrode of the first transistor T1 is electrically connected to the gate electrode of the second transistor T2, the voltage of the gate electrode of the first transistor T1 is the same as the voltage of the second transistor T2. That is, the voltage of the gate electrode of the first transistor T1 and the voltage of the gate electrode of the second transistor T2 each are the first voltage V1. Thus, a ratio of the pixel current generated by the first transistor T1 to the bias current generated by the second transistor T2 is determined based on a ratio of the width-to-length ratio of the first transistor T1 to the width-to-length ratio of the second transistor T2. Therefore, by setting an appropriate width-to-length ratio of the first transistor T1 and an appropriate width-to-length ratio of the second transistor T2, the pixel current generated by the first transistor T1 and the bias current generated by the second transistor T2 can satisfy a certain proportional relation. In a circuit of the two-pole system formed by the first operational amplifier 120 and the pixel circuit 210, the first pole P1 is related to the bias current, and the second pole P2 is related to the pixel current. Therefore, by setting an appropriate width-to-length ratio of the first transistor T1 and an appropriate width-to-length ratio of the second transistor T2, it can ensure that a distance from the first pole P1 to the second pole P2 meets the requirements for the stability of the first operational amplifier 120 and the entire two-pole system circuit.

As an example, a channel type of the first transistor T1 is the same as a channel type of the second transistor T2. Thus, when the first voltage V1 is increased, both the pixel current and the bias current are increased. In this case, in the frequency domain, both a distance from the first pole P1 to the origin and a distance from the second pole P2 to the origin will be increased. When the first voltage V1 is decreased, both the pixel current and the bias current are decreased. In this case, in the frequency domain, both the distance from the first pole P1 to the origin and distance from the second pole P2 to the origin are decreased. Thus, the distance from the first pole P1 to the second pole P2 can always be kept within a suitable range, which is advantageous to ensure the stability of the first operational amplifier 120 and the entire two-pole system. Moreover, the bias current changes in the same manner as the pixel current changes (that is, the bias current is increased when the pixel current is increased, and the bias current is decreased when the pixel current is decreased), thereby facilitating reducing the power consumption of the data driving circuit.

On the basis of the technical solution described above, for example, the ratio of the width-to-length ratio of the second transistor T2 to the width-to-length ratio of the first transistor T1 is greater than or equal to a first threshold, which meets the following conditions.

When the first voltage V1 connected to the gate electrode of the first transistor T1 corresponds to a data voltage VDATA corresponding to any grayscale, the bias current generated by the bias current generation circuit 121 can allow the first operational amplifier 120 to operate stably.

Specifically, when forming the data driving circuit, multiple tests can be performed. For example, taking an 8-bit display panel as an example, after the width-to-length ratio of the first transistor T1 and the width-to-length ratio of the second transistor T2 are set, the stability of the operation of the first operational amplifier 120 in the data driving circuit and the stability of the two-pole system are tested under each grayscale from 0 grayscale to 255 grayscale. The tests may be performed in software, or the tests may be performed for an actual hardware circuit after the data driving circuit is actually manufactured. Then, when the first voltage V1 connected to the gate electrode of the first transistor T1 corresponds to the data voltage VDATA corresponding to any grayscale, the bias current generated by the bias current generation circuit 121 can allow the first operational amplifier 120 to operate stably, thereby ensuring the stability of the operation of the first operational amplifier 120.

With further reference to FIG. 3, as an example, the pixel current generation circuit 110 further includes a second operational amplifier 111. The second operational amplifier 111 has a non-inverting input terminal serving as the input terminal IN1 of the pixel current generation circuit 110 and connected to the data voltage VDATA, an inverting input terminal electrically connected to the output terminal of the second operational amplifier 111, and an output terminal that is electrically connected to the gate electrode of the first transistor T1. The first voltage is outputted via the output terminal of the second operational amplifier 111.

Specifically, after the data voltage VDATA is inputted via the non-inverting input terminal V+ of the second operational amplifier 111, a first voltage equal to the data voltage VDATA can be outputted via the output terminal of the second operational amplifier 111, but a driving capability of the first voltage is higher than a driving capability of the data voltage VDATA. In the display panel, the pixel current generation circuit 110 usually needs to be connected to a column of pixel circuits 210, so a driving signal with a higher driving capability is required. By providing the pixel current generation circuit 110 with a second operational amplifier 111, the first voltage of the gate electrode of the first transistor T1 at the input terminal has a higher driving capability, so that the voltage of the output terminal of the pixel current generation circuit 110 also has a higher driving capability, thereby allowing the pixel circuit 210 driven by the data driving circuit to operate normally and thus finally ensuring a display effect of the display panel including the pixel circuit 210.

With further reference to FIG. 3, the amplification circuit 122 includes a third transistor T3, a fourth transistor T4, a fifth transistor T5, and a sixth transistor T6.

The third transistor T3 has a gate electrode electrically connected to a gate electrode of the fourth transistor T4, a first electrode electrically connected to a first electrode of the fourth transistor T4 and connected to a power supply voltage, and a second electrode electrically connected to a first electrode of the fifth transistor T5. The gate electrode of the third transistor T3 is further electrically connected to the first electrode of the fifth transistor T5. The first electrode of the fourth transistor T4 is connected to the power supply voltage. The fifth transistor T5 has a gate electrode electrically connected to the first electrode of the first transistor T1, and a second electrode electrically connected to the first electrode of the second transistor T2.

The fourth transistor T4 has a second electrode electrically connected to a first electrode of the sixth transistor T6. The sixth transistor T6 has a gate electrode electrically connected to the inverting input terminal V− of the first operational amplifier 120, and a second electrode electrically connected to the first electrode of the second transistor T2.

Figure 4:
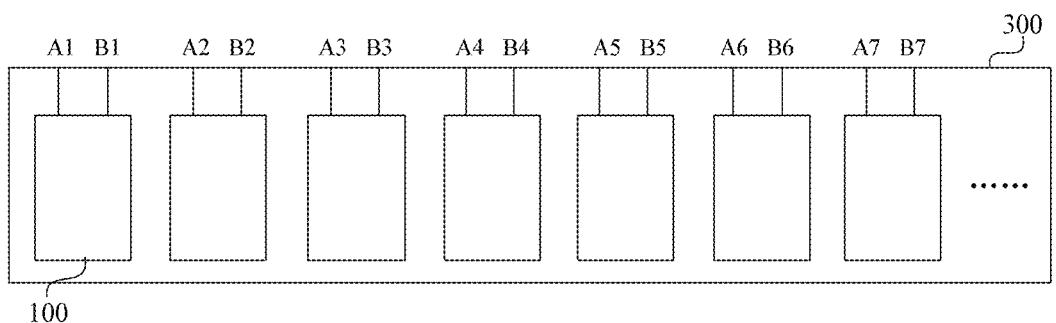
FIG. 4 is a schematic diagram of a structure of a driving chip according to an embodiment of the present disclosure.

The embodiments of the present disclosure further provide a driving chip. FIG. 4 is a schematic diagram of a structure of a driving chip according to an embodiment of the present disclosure. With reference to FIG. 4, the driving chip 300 includes a plurality of data driving circuits 100 provided by any of the foregoing embodiments of the present disclosure. The driving chip further includes a plurality of first terminals (A1, A2, A3, A4, A5, A6, A7 . . . ) and a plurality of second terminals (B1, B2, B3, B4, B5, B6, B7 . . . ). Each first terminal is connected to the output terminal of the pixel current generation circuit of one data driving circuit, and each second terminal is connected to the output terminal of the first operational amplifier of one data driving circuit. Herein, for a specific structure of the data driving circuit that is not shown in FIG. 4, a reference can be made to any data driving circuit provided by any of the foregoing embodiments of the present disclosure.

The driving chip provided by this embodiment includes the data driving circuit provided in any of the foregoing embodiments of the present disclosure. The data driving circuit includes the pixel current generation circuit and the first operational amplifier. The pixel current generation circuit includes the input terminal and the output terminal, and the pixel current generation circuit is configured to generate the pixel current based on the data voltage inputted via the input terminal. The output terminal of the pixel current generation circuit is configured to be connected to the pixel circuit. The first operational amplifier includes the first input terminal, the second input terminal, and the output terminal. The first input terminal of the first operational amplifier is connected to the output terminal of the pixel current generation circuit, and the first voltage is inputted via the second input terminal of the first operational amplifier. The first voltage is positively related to the data voltage. The output terminal of the first operational amplifier is configured to be connected to the pixel circuit. The first operational amplifier is configured to generate the bias current based on the first voltage. With the driving chip provided by this embodiment, each pixel current generated by the pixel current generation circuit corresponds to a respective bias current of the first operational amplifier adapted thereto. Compared with an operational amplifier with a large fixed bias current in the related art, the embodiments of the present disclosure can facilitate reducing the power consumption of the data driving circuit while ensuring the stability of the operational amplifier and the two-pole system.

Figure 5:
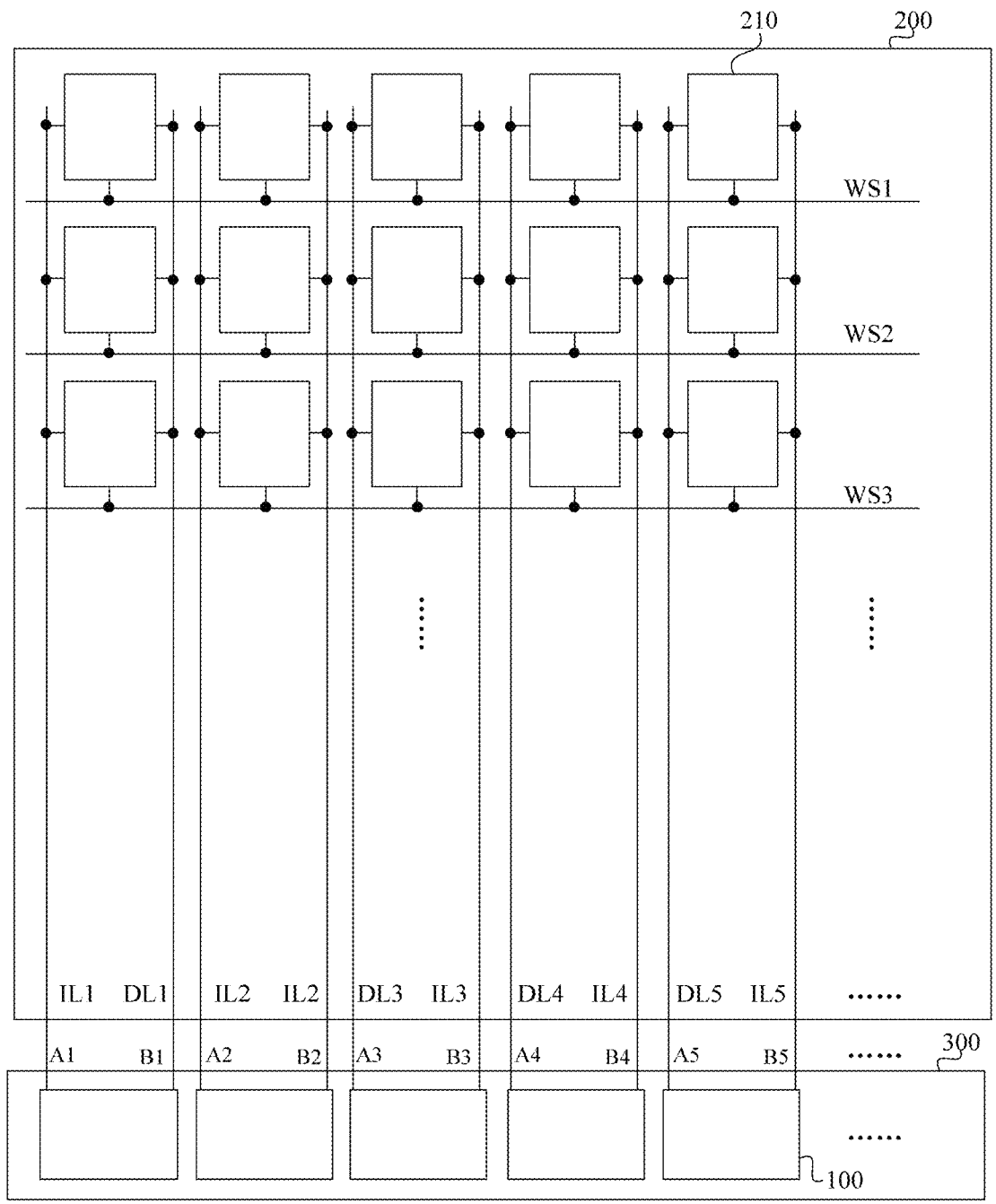
FIG. 5 is a schematic diagram of a structure of a display device according to an embodiment of the present disclosure.
Figure 6:
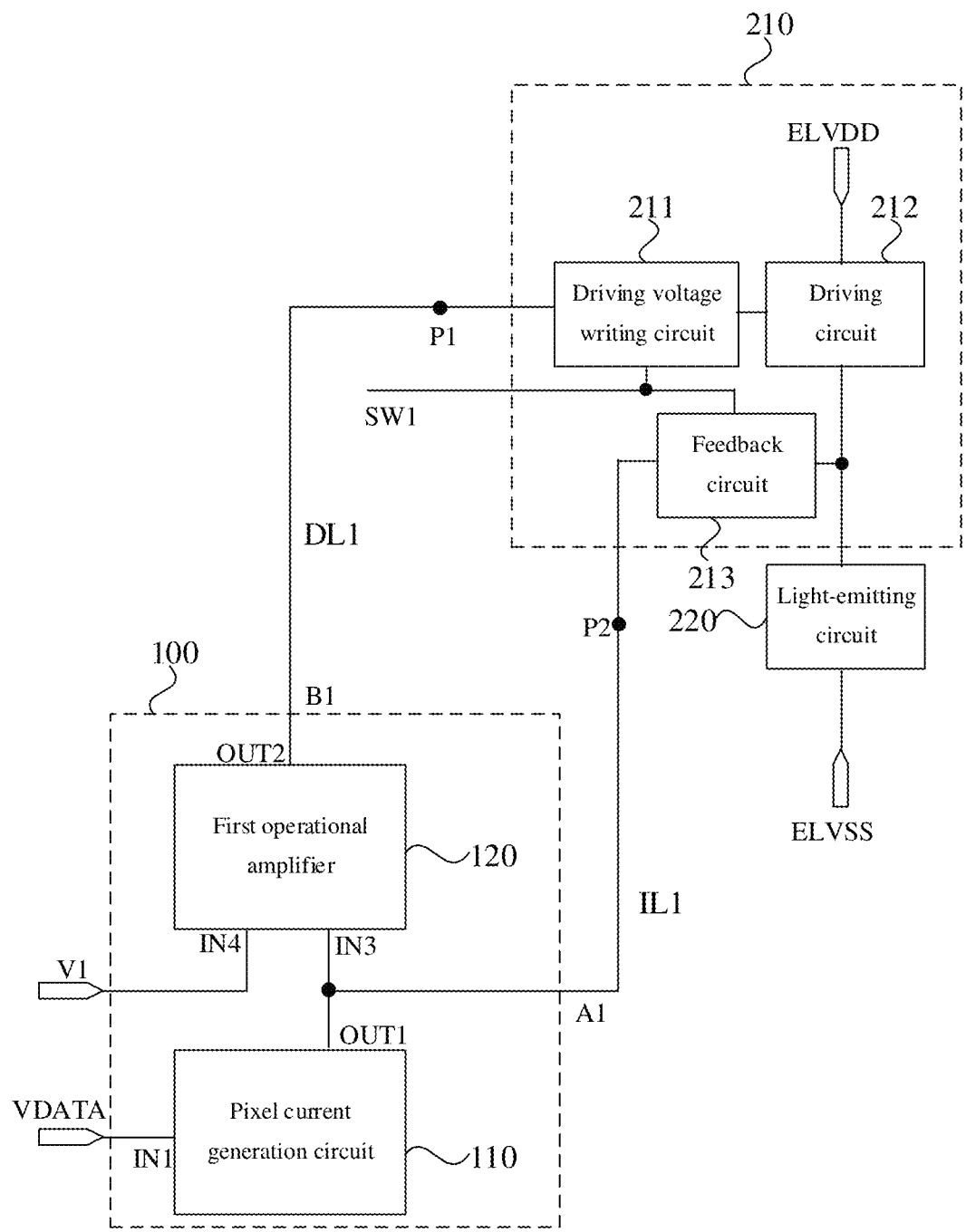
FIG. 6 is a schematic diagram of a connection structure of a data driving circuit and a pixel circuit according to an embodiment of the present disclosure.

The embodiments of the present disclosure further provide a display device. FIG. 5 is a schematic diagram of a structure of a display device according to an embodiment of the present disclosure, and FIG. 6 is a schematic diagram of a connection structure of a data driving circuit and a pixel circuit according to an embodiment of the present disclosure. FIG. 6 is a schematic diagram of a connection structure of a data driving circuit and a pixel circuit shown in FIG. 5. With reference to FIG. 5 and FIG. 6, the display device includes the driving chip 300 provided in the foregoing embodiments, and further includes a display panel 200. The display panel 200 includes a plurality of pixel circuits 210, a plurality of pixel current transmission lines (IL1, IL2, IL3, IL4, IL5 . . . ) one-to-one corresponding to the plurality of data driving circuits 100, driving voltage transmission lines (DL1, DL2, DL3, DL4, DL5 . . . ), and a plurality of scan lines (WS1, WS2, WS3 . . . ). Each pixel circuit 210 includes a driving voltage writing circuit 211, a driving circuit 212 and a feedback circuit 213.

Each of the first terminals (A1, A2, A3, A4, A5, etc.) of the driving chip 300 is connected to the feedback circuits 213 of a respective column of pixel circuits 210 via a respective pixel current transmission line. The feedback circuit 213 is configured to feed back the pixel current to a corresponding first terminal based on a scan signal transmitted on the scan line. Each of the second terminals (B1, B2, B3, B4, B5, B6, B7 . . . ) of the driving chip 300 is connected to the driving voltage writing circuits 211 of a respective column of pixel circuits 210 via a respective driving voltage transmission line. The driving voltage writing circuit 211 is configured to write a driving voltage to a control terminal of the driving circuit 212 based on the scan signal transmitted on the scan line.

With reference to FIG. 6, the display panel further includes a plurality of light-emitting circuits 220 one-to-one corresponding to the plurality of pixel circuits 210. When writing the data voltage VDATA, a scan pulse signal can be transmitted on the scan line, the driving voltage writing circuit 211 and the feedback circuit 213 are turned on, and thus a closed loop system is formed between the data driving circuit and the pixel circuit 210. The closed loop system is a two-pole system.

With reference to FIG. 6, the data driving circuit 100 includes a pixel current generation circuit 110 and a first operational amplifier 120. The pixel current generation circuit 110 includes an input terminal IN1 and an output terminal OUT1, and the pixel current generation circuit 110 is configured to generate a pixel current based on a data voltage VDATA inputted via the input terminal. The output terminal of the pixel current generation circuit 110 is configured to be connected to the pixel circuit 210. The first operational amplifier 120 includes a first input terminal IN3, a second input terminal IN4, and an output terminal. The first input terminal IN3 of the first operational amplifier 120 is connected to the output terminal of the pixel current generation circuit 110. A first voltage V1 is inputted via the second input terminal IN4 of the first operational amplifier 120, and is positively related to the data voltage VDATA. The output terminal OUT2 of the first operational amplifier 120 is configured to be connected to the pixel circuit 210. The operational amplifier is configured to generate a bias current based on the first voltage V1. With the display device provided by this embodiment, each pixel current generated by the pixel current generation circuit 110 corresponds to a respective bias current of the first operational amplifier adapted thereto. Compared with an operational amplifier with a large fixed bias current in the related art, the embodiments of the present disclosure can facilitate reducing the power consumption of the data driving circuit while ensuring the stability of the operational amplifier and the two-pole system.

Figure 7:
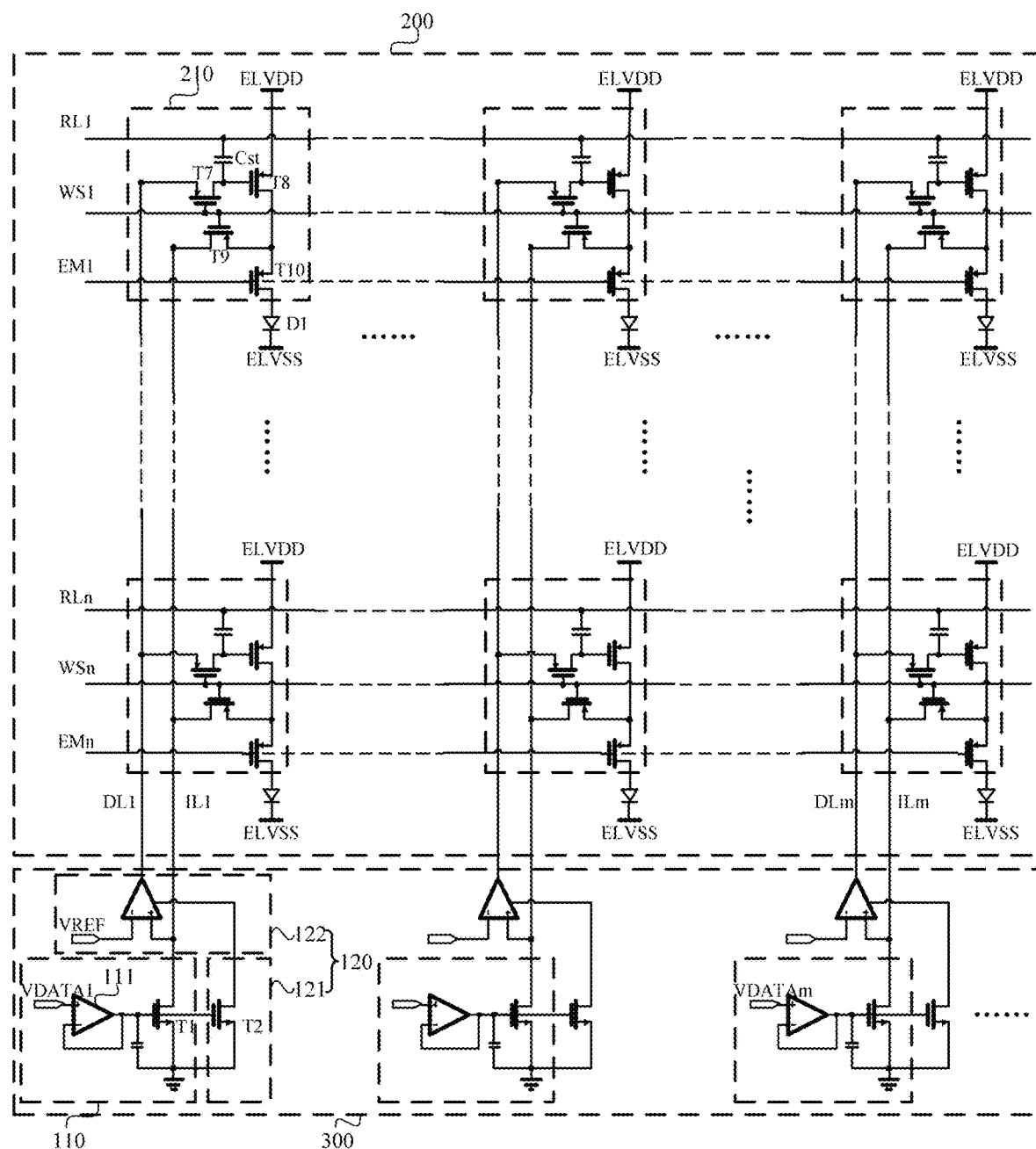
FIG. 7 is a schematic diagram of a structure of another display device according to an embodiment of the present disclosure.
Figure 8:
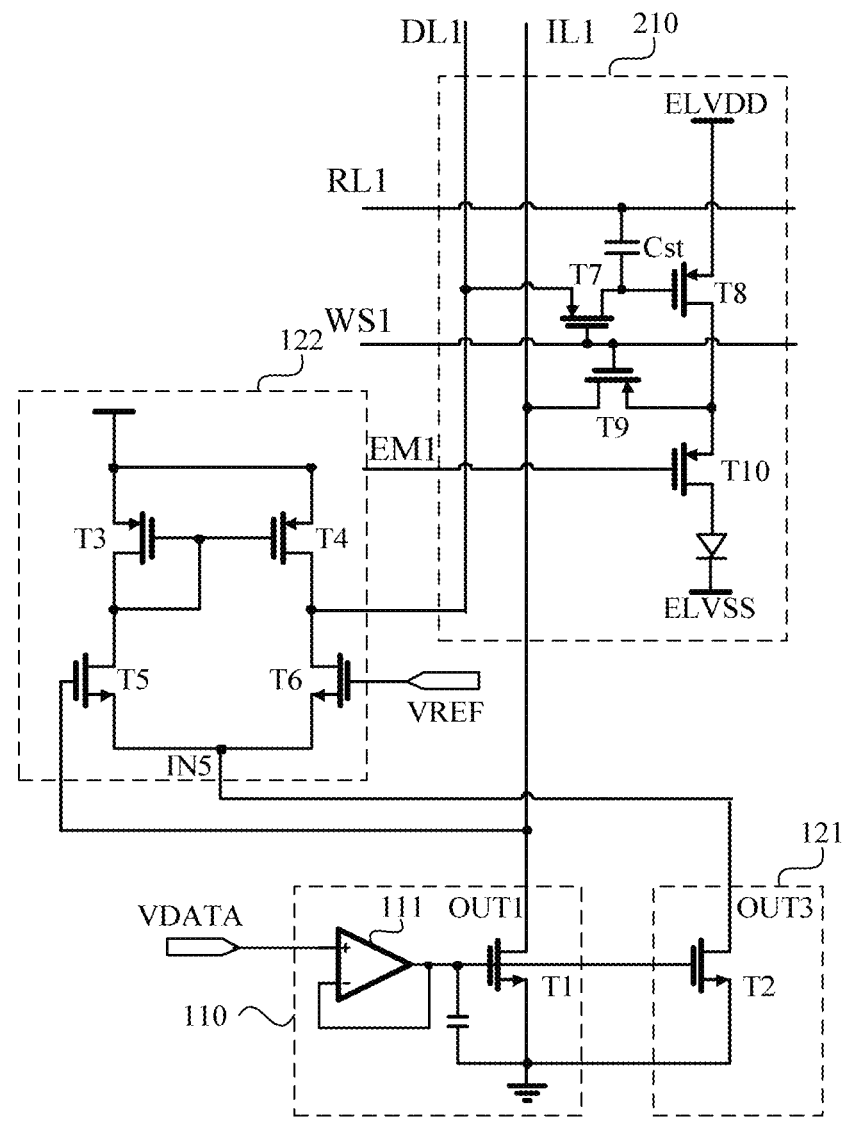
FIG. 8 is a schematic diagram of another connection structure of a data driving circuit and a pixel circuit according to an embodiment of the present disclosure.

FIG. 7 is a schematic diagram of another structure of a display device according to an embodiment of the present disclosure, and FIG. 8 is a schematic diagram of another connection structure of a data driving circuit and a pixel circuit according to an embodiment of the present disclosure. FIG. 8 is a schematic diagram of a connection structure of a data driving circuit and a pixel circuit shown in FIG. 7. With reference to FIG. 7 and FIG. 8, as an example, the driving voltage writing circuit 211 includes a seventh transistor T7, the driving circuit 212 includes an eighth transistor T8, the feedback circuit 213 includes a ninth transistor T9, the pixel circuit 210 further includes a tenth transistor T10 and a first capacitor Cst, and the display panel 200 further includes a plurality of reference voltage lines (RL1 . . . RLn) and a plurality of light-emitting control lines (EM1 . . . EMn). Each of the scan lines (WS1 . . . WSn) is connected to gate electrodes of the seventh transistors T7 and gate electrodes of the ninth transistors T9 of a respective row of pixel circuits 210. Each of the reference voltage lines is connected to first terminals of the first capacitors Cst of a respective row of pixel circuits 210. Each of the light-emitting control lines is connected to gate electrodes of the tenth transistors T10 of a respective row of pixel circuits 210.

The seventh transistor T7 has a first electrode connected to the driving voltage transmission line (DL1), and a second electrode connected to a gate electrode of the eighth transistor T8.

The eighth transistor T8 has a first electrode connected to a first power supply voltage ELVDD, and a second electrode connected to a first electrode of the tenth transistor T10. The tenth transistor T10 has a second electrode connected to an anode of a light-emitting device. The light-emitting device includes a cathode connected to a second power supply voltage ELVSS.

The ninth transistor T9 has a first electrode electrically connected to the second electrode of the eighth transistor T8, and a second electrode connected to the pixel current transmission line.

The first capacitor Cst has a second terminal electrically connected to the gate electrode of the eighth transistor T8.

Figure 9:
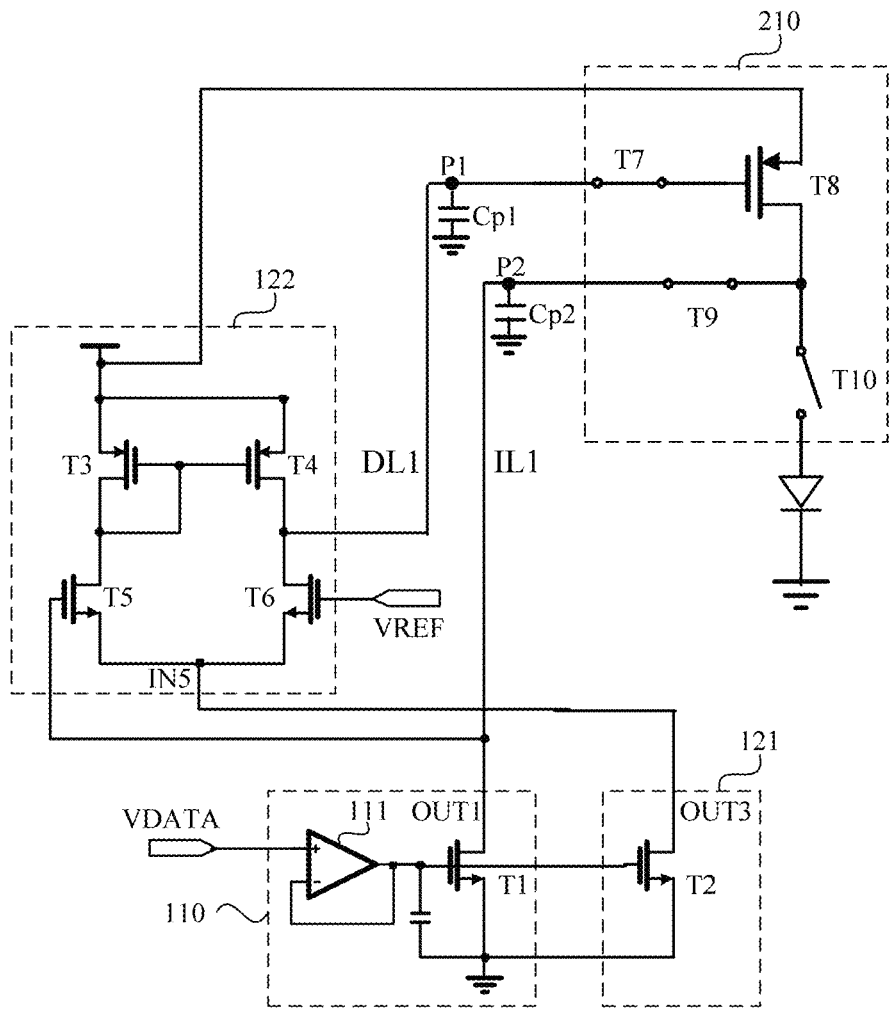
FIG. 9 is a schematic diagram of another connection structure of a data driving circuit and a pixel circuit according to an embodiment of the present disclosure.

With reference to FIG. 8, an operation process of each pixel circuit 210 may include a data writing phase and a light-emitting phase. In the data writing phase, the data driving circuit in the driving chip 300 outputs a driving voltage to the pixel circuit 210, and a scan pulse signal is transmitted on the scan line. At this time, the seventh transistor T7 and the ninth transistor T9 are turned on, the light-emitting control line does not provide a light-emitting control pulse signal to the gate electrode of the tenth transistor T10, and the tenth transistor T10 is turned off. In the light-emitting phase, the seventh transistor T7 and the ninth transistor T9 are turned off, the tenth transistor T10 is turned on, and the eighth transistor T8 drives the light-emitting device to emit light. FIG. 9 is a schematic diagram of another connection structure of a data driving circuit and a pixel circuit according to an embodiment of the present disclosure, which can correspond to a circuit state of the pixel circuit 210 in the circuit structure shown in FIG. 8 in the data writing phase. With reference to FIG. 9, the data driving circuit 100 and the pixel circuit 210 form a closed loop and form a two-pole system. A first pole P1 is formed at the output terminal OUT2 of the first operational amplifier 120, and a position of the first pole P1 in a frequency domain is determined based on output impedances of the fourth transistor T4 and the sixth transistor T6 and a first parasitic capacitance at the first pole P1. A second pole P2 is formed at the output terminal of the pixel current generation circuit 110, and a position of the second pole P2 in a frequency domain is determined based on an output impedance and a second parasitic capacitance at this position. A calculation formula for the first pole P1 is p1=1/(r1*Cp1), where p1 denotes the first pole P1, r1 denotes the output impedance at the first pole P1, and Cp1 denotes the first parasitic capacitance at the first pole P1. A calculation formula for the second pole P2 is p2=1/(r2*Cp2) where p2 denotes the second pole P2, r2 denotes the output impedance at the second pole P2, and Cp2 denotes the second parasitic capacitance at the second pole P2. The signal line traverses the pixel circuit 210 at each of the positions where the first pole P1 and the second pole P2 are formed. Therefore, at the positions where the first pole P1 and the second pole P2 are formed, the first parasitic capacitance is considered to be equal to the second parasitic capacitance. Thus, a positional relation between the first pole P1 and the second pole P2 is related to the output impedances at the first pole P1 and the second pole P2, and the output impedance is inversely proportional to the current when ignoring an effect of channel length modulation. That is, the larger current leads to the smaller output impedance and to that the position of the pole in the frequency domain is farther. That is, as mentioned in the foregoing embodiment, the larger bias current leads to that the position of the first pole P1 is farther from the origin in the frequency domain. The larger pixel current leads to that the position of the second pole P2 is farther from the origin in the frequency domain. In the display device provided by this embodiment, the gate electrode of the second transistor T2 of the bias current generation circuit 121 is electrically connected to the gate electrode of the first transistor T1 of the pixel current generation circuit 110, that is, the voltage of the gate electrode of the first transistor T1 is equal to the voltage of the gate electrode of the second transistor T2. Moreover, the potential of the source electrode of the first transistor T1 is the same as the potential of the source electrode of the second transistor T2. Thus, the bias current changes in the same manner as the pixel current changes, that is, the bias current is increased when the pixel current is increased, and the bias current is decreased when the pixel current is decreased. That is, the position of the first pole P1 and the position of the second pole P2 in the frequency domain are both close to or both far from the origin. Therefore, by setting an appropriate relation between a width-to-length ratio of the first transistor T1 and a width-to-length ratio of the second transistor T2, the bias current can allow the first operational amplifier 120 and the two-pole system to operate stably under the pixel current corresponding to any grayscale.

It should be noted that in the display device shown in FIG. 5 and FIG. 7, the driving chip 300 and the display panel 200 may be formed into one piece. That is, a circuit structure in the driving chip 300 and a pixel circuit structure of the display panel 200 may be formed on a same substrate. The driving chip 300 and display panel 200 may also be discrete structures. That is, the circuit structure in the driving chip 300 and the pixel circuit structure in the display panel 200 may be formed on different substrates, and then the driving chip 300 is bonded to the display panel 200. The embodiments of the present disclosure do not make any limitation thereto.

Figure 10:
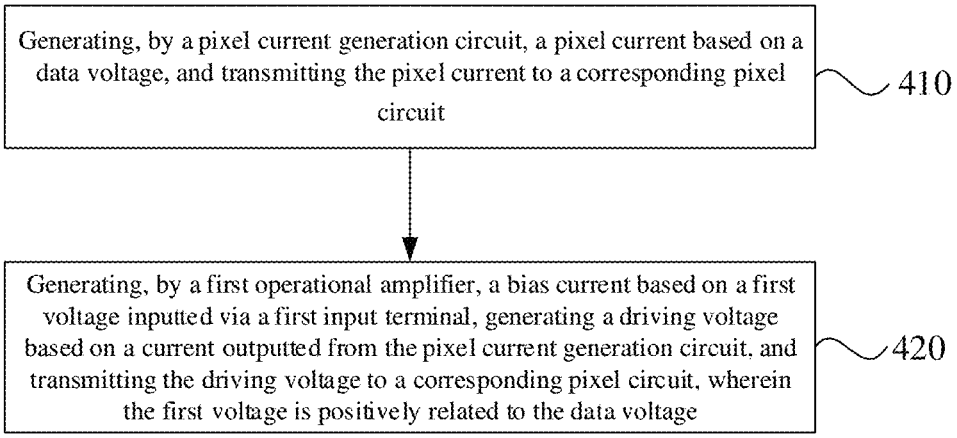
FIG. 10 is a flowchart of a driving method for a display device according to an embodiment of the present disclosure.

The embodiments of the present disclosure further provide a driving method for a display device. FIG. 10 is a flowchart of a driving method for a display device according to an embodiment of the present disclosure. With reference to FIG. 10, the driving method for the display device includes following steps.

At step 410, the pixel current generation circuit generates a pixel current based on a data voltage, and transmits the pixel current to a pixel circuit;

At step 420, a first operational amplifier generates a bias current based on a first voltage inputted via a first input terminal, and generates a driving voltage based on a current outputted from the pixel current generation circuit and transmits it to a corresponding pixel circuit. The first voltage is positively related to the data voltage.

With the driving method for the display device provided by this embodiment, the pixel current generation circuit generates the corresponding pixel current based on the data voltage and transmits the pixel current to the corresponding pixel circuit, the first operational amplifier generates the bias current based on the first voltage inputted via the first input terminal and generates the driving voltage based on the current outputted from the pixel current generation circuit and transmits it to the corresponding pixel circuit. The first voltage is positively related to the data voltage. Thus, each pixel current generated by the pixel current generation circuit can correspond to a respective bias current of the first operational amplifier adapted thereto. Compared with an operational amplifier with a large fixed bias current in the related art, the embodiments of the present disclosure can facilitate reducing the power consumption of the data driving circuit while ensuring the stability of the operational amplifier and the two-pole system.

It should be noted that the above descriptions are merely preferred embodiments of the present disclosure and technical principles applied thereto. Those skilled in the art will understand that the present disclosure is not limited to the specific embodiments described herein. In addition, those skilled in the art may make various obvious changes, readjustments, and substitutions without departing from the scope of the present disclosure. Therefore, although the present disclosure has been described in details through the above embodiments, the present disclosure is not limited to the above embodiments, and may include other equivalent embodiments without departing from the concept of the present disclosure. The scope is determined by the appended claims.

What is claimed is:

1. A data driving circuit, comprising:
a pixel current generation circuit comprising an input terminal and an output terminal and configured to generate a pixel current based on a data voltage inputted via the input terminal, wherein the output terminal of the pixel current generation circuit is configured to be connected to a pixel circuit; and
a first operational amplifier comprising a first input terminal, a second input terminal, and an output terminal, wherein the first input terminal of the first operational amplifier is connected to the output terminal of the pixel current generation circuit, a first voltage is inputted via the second input terminal of the first operational amplifier and is positively related to the data voltage, and the output terminal of the first operational amplifier is configured to be connected to the pixel circuit; and wherein the first operational amplifier is configured to generate a bias current based on the first voltage,
wherein the first operational amplifier comprises:
a bias current generation circuit comprising an input terminal and an output terminal, wherein the input terminal of the bias current generation circuit serves as the second input terminal of the first operational amplifier, and the bias current generation circuit is configured to generate the bias current based on the first voltage inputted via the input terminal of the bias current generation circuit; and
an amplifier circuit comprising a non-inverting input terminal, an inverting input terminal, a bias current input terminal, and a driving voltage output terminal, wherein the non-inverting input terminal of the amplifier circuit serves as the first input terminal of the first operational amplifier, a reference voltage is inputted via the inverting input terminal of the amplifier circuit, the bias current input terminal of the amplifier circuit is electrically connected to the output terminal of the bias current generation circuit, and the driving voltage output terminal of the amplifier circuit serves as the output terminal of the first operational amplifier.

2. The data driving circuit according to claim 1, wherein the pixel current generation circuit further comprises a first transistor, and the first transistor has a gate electrode via which the first voltage is inputted, a first electrode serving as the output terminal of the pixel current generation circuit, and a second electrode connected to ground; and
the bias current generation circuit comprises a second transistor, and the second transistor has a gate electrode electrically connected to the gate electrode of the first transistor, a first electrode serving as the output terminal of the bias current generation circuit and electrically connected to the bias current input terminal of the amplifier circuit, and a second electrode connected to ground.

3. The data driving circuit according to claim 2, wherein a ratio of a width-to-length ratio of the second transistor to a width-to-length ratio of the first transistor is greater than or equal to a first threshold, and the first threshold is set in such a manner that when the first voltage inputted via the gate electrode of the first transistor corresponds to a data voltage corresponding to any grayscale, the bias current generated by the bias current generation circuit allows the first operational amplifier to operate stably.

4. The data driving circuit according to claim 2, wherein the pixel current generation circuit further comprises a second operational amplifier, and the second operational amplifier has a non-inverting input terminal serving as the input terminal of the pixel current generation circuit, an inverting input terminal electrically connected to an output terminal of the second operational amplifier, and the output terminal electrically connected to the gate electrode of the first transistor; and wherein the first voltage is outputted via the output terminal of the second operational amplifier.

5. The data driving circuit according to claim 2, wherein the amplifier circuit comprises a third transistor, a fourth transistor, a fifth transistor, and a sixth transistor;
the third transistor has a gate electrode electrically connected to a gate electrode of the fourth transistor and to a first electrode of the fifth transistor, a first electrode connected to a power supply voltage, and a second electrode electrically connected to a first electrode of the fifth transistor;

the fifth transistor has a gate electrode electrically connected to the first electrode of the first transistor, and a second electrode electrically connected to the first electrode of the second transistor;

the fourth transistor has a first electrode connected to the power supply voltage, and a second electrode electrically connected to a first electrode of the sixth transistor; and the sixth transistor has a gate electrode electrically connected to the inverting input terminal of the first operational amplifier, and a second electrode electrically connected to the first electrode of the second transistor.

6. A driving chip, comprising:
a plurality of data driving circuits each being the data driving circuit according to claim 1;
a plurality of first terminals, wherein each of the plurality of first terminals is connected to the output terminal of the pixel current generation circuit of one of the plurality of data driving circuits; and
a plurality of second terminals, wherein each of the plurality of second terminals is connected to the output terminal of the first operational amplifier of one of the plurality of data driving circuits.

7. A display device, comprising:
the driving chip according to claim 6; and
a display panel comprising a plurality of pixel circuits, a plurality of pixel current transmission lines each one corresponding to one of the plurality of data driving circuits, a plurality of driving voltage transmission lines and a plurality of scan lines,
wherein each of the plurality of pixel circuits comprises a driving voltage writing circuit, a driving circuit, and a feedback circuit,
each of the plurality of first terminals of the driving chip is connected to the feedback circuits of one column of pixel circuits of the plurality of pixel circuits via a corresponding one of the plurality of pixel current transmission lines,
the feedback circuit is configured to feed back the pixel current to a corresponding one of the plurality of first terminals based on a scan signal transmitted on one of the plurality of scan lines,
each of the plurality of second terminals of the driving chip is connected to the driving voltage writing circuits of one column of pixel circuits of the plurality of pixel circuits via a corresponding one of the plurality of driving voltage transmission lines, and
the driving voltage writing circuit is configured to write a driving voltage to a control terminal of the driving circuit based on a scan signal transmitted on one of the plurality of scan lines.

8. The display device according to claim 7, wherein the driving voltage writing circuit comprises a seventh transistor, the driving circuit comprises an eighth transistor, the feedback circuit comprises a ninth transistor, each of the plurality of pixel circuits further comprises a tenth transistor and a first capacitor, and the display panel further comprises a plurality of reference voltage lines and a plurality of light-emitting control lines, each of the plurality of scan lines is connected to gate electrodes of the seventh transistors and gate electrodes of the ninth transistors of one row of pixel circuits of the plurality of pixel circuits, each of the plurality of reference voltage lines is connected to first terminals of the first capacitors of one row of pixel circuits of the plurality of pixel circuits, and each of the plurality of light-emitting control lines is connected to gate electrodes of the tenth transistors of one row of pixel circuits of the plurality of pixel circuits, the seventh transistor has a first electrode connected to one of the plurality of driving voltage transmission lines, and a second electrode connected to a gate electrode of the eighth transistor, the eighth transistor has a first electrode connected to a first power supply voltage, and a second electrode connected to a first electrode of the tenth transistor, the tenth transistor has a second electrode connected to an anode of a light-emitting device, the light-emitting device comprises a cathode connected to a second power supply voltage, the ninth transistor has a first electrode electrically connected to the second electrode of the eighth transistor, and a second electrode connected to one of the plurality of pixel current transmission lines, and the first capacitor has comprised a second terminal electrically connected to the gate electrode of the eighth transistor.

* * * * *